United States Patent
Hung et al.

(10) Patent No.: US 10,122,200 B2
(45) Date of Patent: Nov. 6, 2018

(54) LITHIUM BATTERY CONTROL CIRCUIT AND LITHIUM BATTERY CHARGER WITH SURGE CURRENT PROTECTION

(71) Applicant: Winbond Electronics Corp., Taichung (TW)

(72) Inventors: Chung-Chih Hung, Taichung (TW); Chun-Yen Chiang, Taichung (TW)

(73) Assignee: Winbond Electronics Corp., Taichung (TW)

( * ) Notice: Subject to any disclaimer, the term of this patent is extended or adjusted under 35 U.S.C. 154(b) by 189 days.

(21) Appl. No.: 15/405,282

(22) Filed: Jan. 12, 2017

(65) Prior Publication Data
US 2018/0198304 A1    Jul. 12, 2018

(51) Int. Cl.
*H02J 7/00*      (2006.01)
*G11C 7/00*      (2006.01)

(52) U.S. Cl.
CPC .......... *H02J 7/0072* (2013.01); *H02J 7/0068* (2013.01)

(58) Field of Classification Search
CPC ....... Y02E 60/12; H02J 7/0042; H02J 7/0045; H02J 7/0072; H02J 7/0068; H02J 7/0031; H02J 2007/004; H02J 2007/037; H01M 10/44; H01M 10/46; H01M 10/48; G11C 7/062; G11C 7/065; G11C 7/06; G11C 7/067; G11C 11/4091; H03K 5/02; H03K 3/356017; H03K 3/356095
(Continued)

(56) References Cited

U.S. PATENT DOCUMENTS 5,710,506 A * 1/1998 Broell ................... H02J 7/0073
                                                          320/145
6,963,186 B2   11/2005 Hobbs
(Continued)

FOREIGN PATENT DOCUMENTS

TW          333722        6/1998
TW        201251270      12/2012
(Continued)

OTHER PUBLICATIONS

"Office Action of Taiwan Counterpart Application," dated Jul. 4, 2017, p. 1-p. 3.

*Primary Examiner* — Yalkew Fantu
*Assistant Examiner* — Mohammed J Sharief
(74) *Attorney, Agent, or Firm* — JCIPRNET (57) ABSTRACT

A lithium battery control circuit and a lithium battery charger are provided. The lithium battery charger includes the lithium battery control circuit. The lithium battery control circuit includes a smooth transition circuit and an off-time control circuit. The smooth transition circuit generates a first voltage according to a sense current signal and a feedback signal, and generates a second voltage according to a mode signal. The smooth transition circuit compares the first voltage with the second voltage to generate a reset signal. The off-time control circuit converts the feedback signal to generate a first current by a voltage-to-current mechanism, and generates a set signal by using the first current and a duty ratio signal. The invention may prevent a surge current and an oscillation phenomenon by the smooth transition circuit. A switching frequency and a ripple size of an output current are controlled by the off-time control circuit.

12 Claims, 7 Drawing Sheets

(58) Field of Classification Search
USPC .............................. 320/107, 134; 327/54, 57
See application file for complete search history.

(56) References Cited

U.S. PATENT DOCUMENTS

| | | | |
|---|---|---|---|
| 7,446,508 | B2 | 11/2008 | Aradachi et al. |
| 7,528,574 | B1 | 5/2009 | Adkins et al. |
| 7,638,981 | B2 | 12/2009 | Matsuda |
| 7,656,121 | B2 * | 2/2010 | Manai .................. H02J 7/0073 |
| | | | 320/125 |
| 7,656,136 | B2 | 2/2010 | Chang |
| 8,084,995 | B2 | 12/2011 | Wei |
| 8,618,885 | B2 | 12/2013 | Zhu et al. |
| 9,142,991 | B2 | 9/2015 | Tu et al. |
| 2004/0207378 | A1 | 10/2004 | Bucur et al. |
| 2010/0301811 | A1 | 12/2010 | Aiura |
| 2012/0086406 | A1 | 4/2012 | Maeagawa |
| 2016/0241049 | A1 * | 8/2016 | Hung .................. H02J 7/0077 |

FOREIGN PATENT DOCUMENTS

| | | |
|---|---|---|
| TW | 201351861 | 12/2013 |
| TW | 201434250 | 9/2014 |
| TW | 201438367 | 10/2014 |
| TW | 201438369 | 10/2014 |
| TW | I496401 | 8/2015 |

* cited by examiner

LITHIUM BATTERY CONTROL CIRCUIT AND LITHIUM BATTERY CHARGER WITH SURGE CURRENT PROTECTION

BACKGROUND OF THE INVENTION

1. Field of the Invention

The invention relates to a lithium battery charging technique, and more particularly, to a lithium battery control circuit and a lithium battery charger capable of improving overall efficiency for a charger.

2. Description of Related Art

Figure 1A:
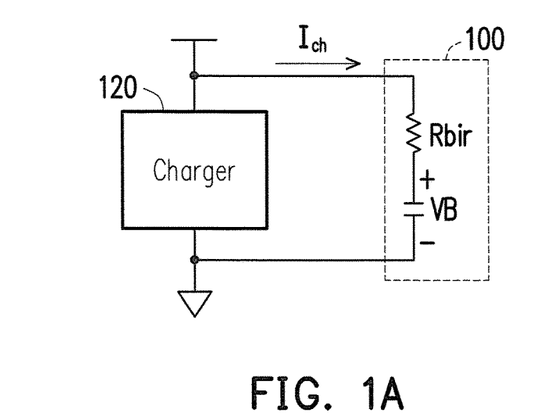
FIG. 1A is an equivalent circuit diagram for charging a conventional lithium battery.

FIG. 1A is an equivalent circuit diagram for charging a conventional lithium battery. Practically, for a lithium battery 100, an internal resistance Rbir thereof is not a constant but a variable. The reason is that the internal resistance Rbir changes in response to influences such as temperature, a charging current Ich, a usage count.

Figure 1B:
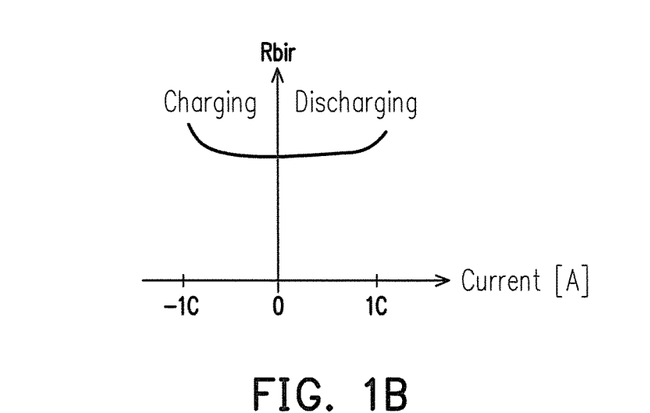
FIG. 1B is a schematic diagram of a relation between internal resistance and current in the lithium battery.

FIG. 1B is a schematic diagram of a relation between internal resistance and current in the lithium battery. In either charging or discharging situation, the internal resistance Rbir of the lithium battery will have larger resistance with regard to larger charging current or discharge current.

Figure 1C:
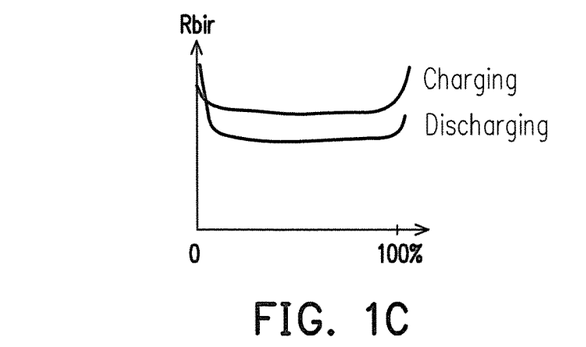
FIG. 1C is a schematic diagram of a relation between internal resistance and battery capacity in the lithium battery.

FIG. 1C is a schematic diagram of a relation between internal resistance and battery capacity in the lithium battery. In either charging or discharging situation, the internal resistance Rbir of the lithium battery will also have larger resistance regardless of whether the lithium battery is at lower percentage of capacity or at higher percentage of capacity.

Figure 2A:
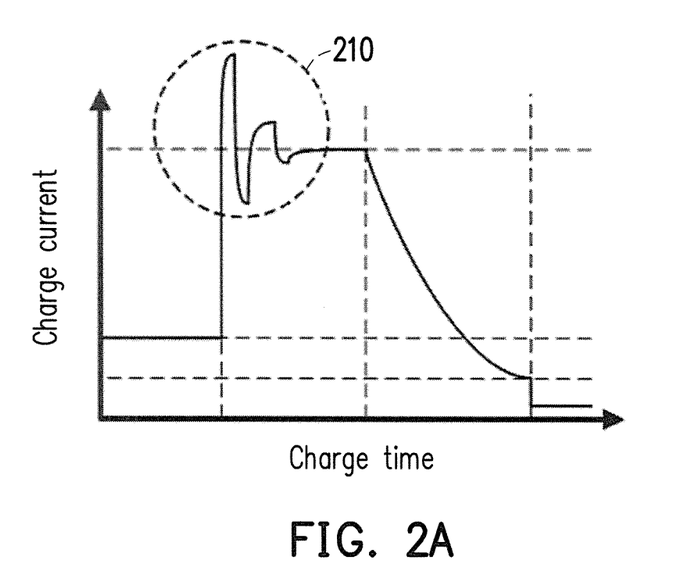
FIG. 2A is a schematic diagram of a charging process of trickle current mode to constant current mode.
Figure 2B:
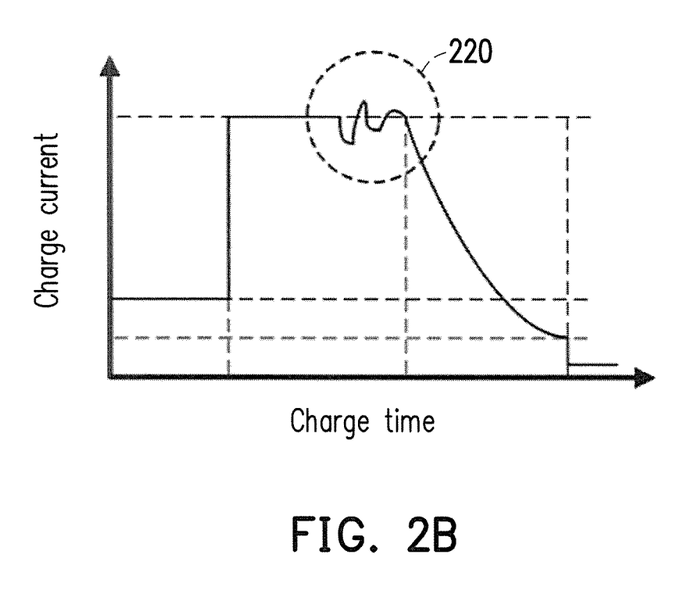
FIG. 2B is a schematic diagram of a charging process of constant current mode to constant voltage mode.

In general, the lithium battery may go through a variety of charging modes during charging. For instance, the charging modes may include trickle current (TC) mode, constant current (CC) mode and constant voltage (CV) mode. FIG. 2A is a schematic diagram of a charging process of trickle current mode to constant current mode. FIG. 2B is a schematic diagram of a charging process constant current mode to-constant voltage mode. When a certain type of charging mode is transitioned (or entered) from another type of charging mode, a surge current will be generated on circuit to cause an oscillation, as shown by a dotted circle 210 of FIG. 2A or a dotted circle 220 of FIG. 2B.

During the charging process, possible reasons for the surge current to happen are analyzed as follows. In FIG. 1A, when a charger 120 detects that a battery voltage VB is high enough and before constant voltage mode is entered from constant current mode, the lithium battery 100 corresponds to larger charging current and higher battery capacity shown by FIG. 1B and FIG. 1C, respectively. In this case, the internal resistance Rbir is larger as compared to the case when smaller charging current and lower battery capacity are present. Based on large current and large resistance, a significant voltage drop is present between two terminals of the internal resistance Rbir. When the charger 120 enters constant voltage mode, the charging current Ich becomes smaller so the inner resistance Rbir of the lithium battery 100 is correspondingly reduced, making the voltage drop instantly smaller. As such, the charger 120 may misjudge that the battery voltage VB is not enough and thus operate by transitioning from constant voltage mode to constant current mode. However, the voltage drop will go up soon enough so the charger 120 enters constant voltage mode again, and oscillation may be stopped only after voltage of the lithium battery 100 reaches a preset value.

Take a buck charger with a common lithium battery for example, in a second half stage (e.g., constant voltage mode) of a charging operation, a buck converter in the circuit scheme is presented as one buck converter in voltage mode, and thus two overlap poles may appear at an input terminal of the buck charger. In order to prevent systems from the oscillation, the conventional technology usually adopts a compensation circuit with a more complex design to solve stability issue, resulting in increased time and cost in R&D.

The compensation circuit may also occupy a considerable amount of circuit area since the compensation circuit used in the charger is quite complex. Based on the consideration of both overall circuit of the charger and safety issue of the battery, a circuit or a mechanism for preventing generation of the surge current should also be further added.

SUMMARY OF THE INVENTION

The invention proposes a lithium battery control circuit and a lithium battery charger for solving aforementioned issue in prior art.

The invention provides a lithium battery control circuit. The lithium battery control circuit includes a smooth transition circuit and an off-time control circuit. The smooth transition circuit generates a first voltage according to the sense current signal and the feedback signal, generates a second voltage according to a mode signal, and compares the first voltage with the second voltage to generate a reset signal. The sense current signal is related to an output current. The feedback signal is related to an output voltage. The mode signal is configured to indicate whether or not in a first charging mode, and the second voltage in the first charging mode is less than the second voltage in a non-first charging mode. The off-time control circuit converts the feedback signal to generate a first current by a voltage-to-current mechanism, and generates a set signal by using the first current and a duty ratio signal.

The invention provides a lithium battery charger. The lithium battery charger includes a lithium battery control circuit, a current sense circuit and a feedback circuit. The lithium battery control circuit includes: a smooth transition circuit, generating a first voltage according to a sense current signal and a feedback signal, generating a second voltage according to a mode signal, and comparing the first voltage with the second voltage to generate a reset signal, wherein the feedback signal is related to an output voltage, the mode signal is configured to indicate whether or not in a first charging mode, and the second voltage in the first charging mode is less than the second voltage in a non-first charging mode; an off-time control circuit, converting the feedback signal to generate a first current by a voltage-to-current mechanism, and generating a set signal by using the first current and a duty ratio signal; a current sense circuit, configured to generate the sense current signal according to an output current; and a feedback circuit, configured to generate the feedback signal according an output voltage.

Based on the above, the lithium battery control circuit and the lithium battery charger of the invention adopts the smooth transition circuit in combination with the off-time control circuit. Because the surge current and the oscillation phenomenon may be prevented by the smooth transition circuit during transition for each of the charging modes and a switching frequency and a ripple size of the output current may be controlled by the off-time control circuit, the overall efficiency for the charger may be improved. The lithium battery control circuit and the lithium battery charger of the invention are a simplified structure since there is no need to dispose the complex compensation circuit on the path of the feedback circuit. On the other hand, in comparison with the conventional charger, the invention may lower complexity of the switching charger while reducing manufacturing costs thereof and is in line with current trends in developing 3C products.

DESCRIPTION OF THE EMBODIMENTS

In the following embodiments, when "A" device is "connected" or "coupled" to a "B" device, the "A" device may be directly connected or coupled to the "B" device, or other devices may probably exist there between. The term "circuit" may represent at least one element or a plurality of elements, or at least one element or a plurality of elements actively and/or passively coupled to each other to provide suitable functions. It should be understood that, with respect to signals referred throughout the specification and the drawings, a physical property thereof may be voltage or current.

Figure 3:
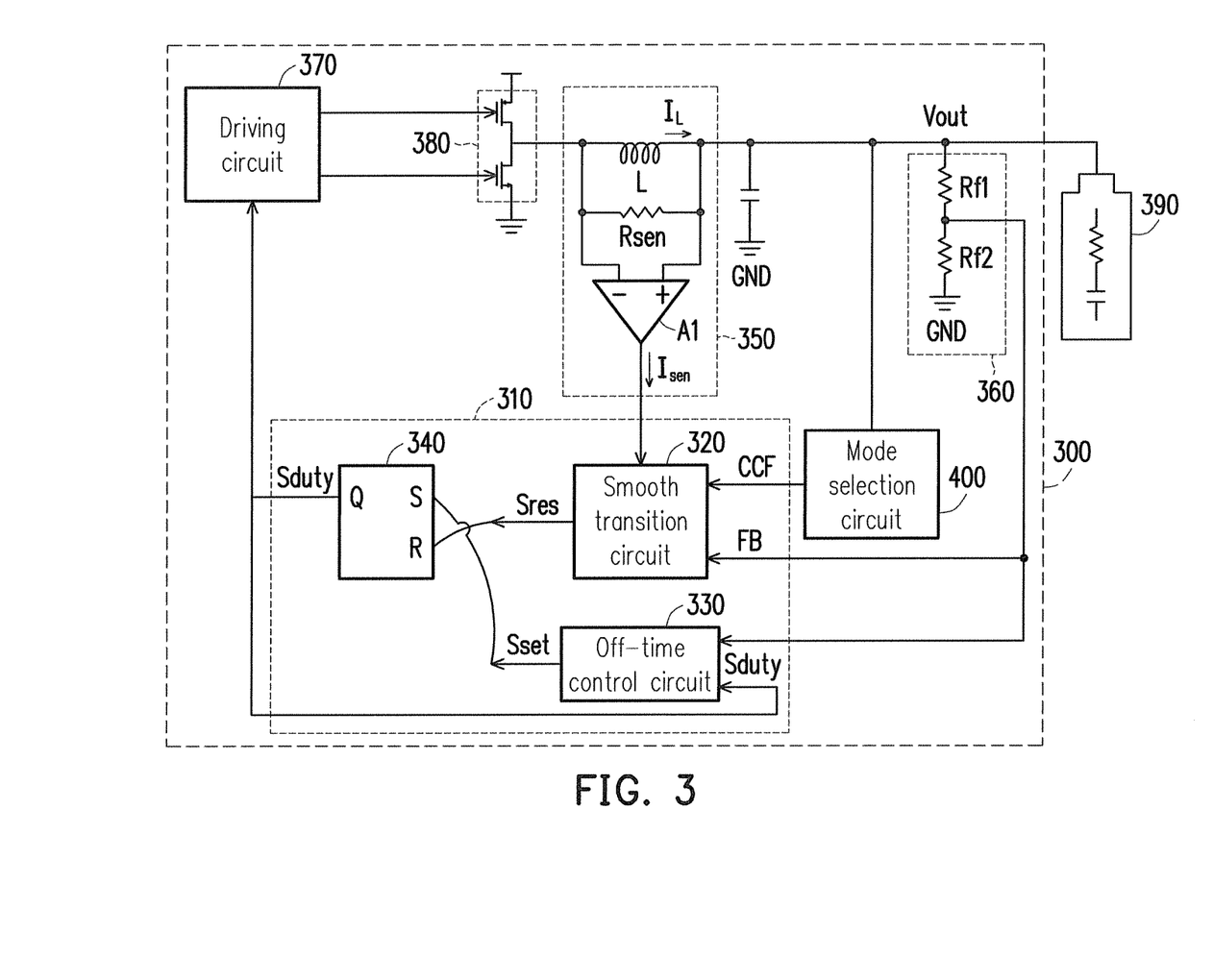
FIG. 3 is a schematic diagram of a lithium battery charger according to an embodiment of the invention.

Referring to FIG. 3, a lithium battery charger 300 may be used to charge a lithium battery charger 390. The lithium battery charger 300 includes a lithium battery control circuit 310, a current sense circuit 350, a feedback circuit 360, a driving circuit 370 and an output stage 380. Hereinafter, "the charging system" or "the system" is used to represent overall circuit composed of the lithium battery charger 300 and the lithium battery 390.

The lithium battery control circuit 310 includes a smooth transition circuit 320, an off-time control circuit 330 and a logic control circuit 340. The current sense circuit 350 includes an inductor L, a resistor Rsen and a comparator A1. The current sense circuit 350 may sense an output current $I_L$ passed through the inductor L and generate a sense current signal Isen according to the output current $I_L$. The current sense circuit 350 is acceptable as long as it may generate the sense current signal Isen according to the output current $I_L$. The feedback circuit 360 may include a resistor Rf1 and a resistor Rf2, or may include a resistance network or a resistance-capacitance network. The feedback circuit 360 is acceptable as long as it may generate a feedback circuit FB according to an output voltage Vout.

Descriptions for introducing how to prevent the surge current and the oscillation phenomenon by the smooth transition circuit 320 and how to control the switching frequency and the ripple size of the output current $I_L$ by the off-time control circuit 330 are provided as follows.

Figure 4:
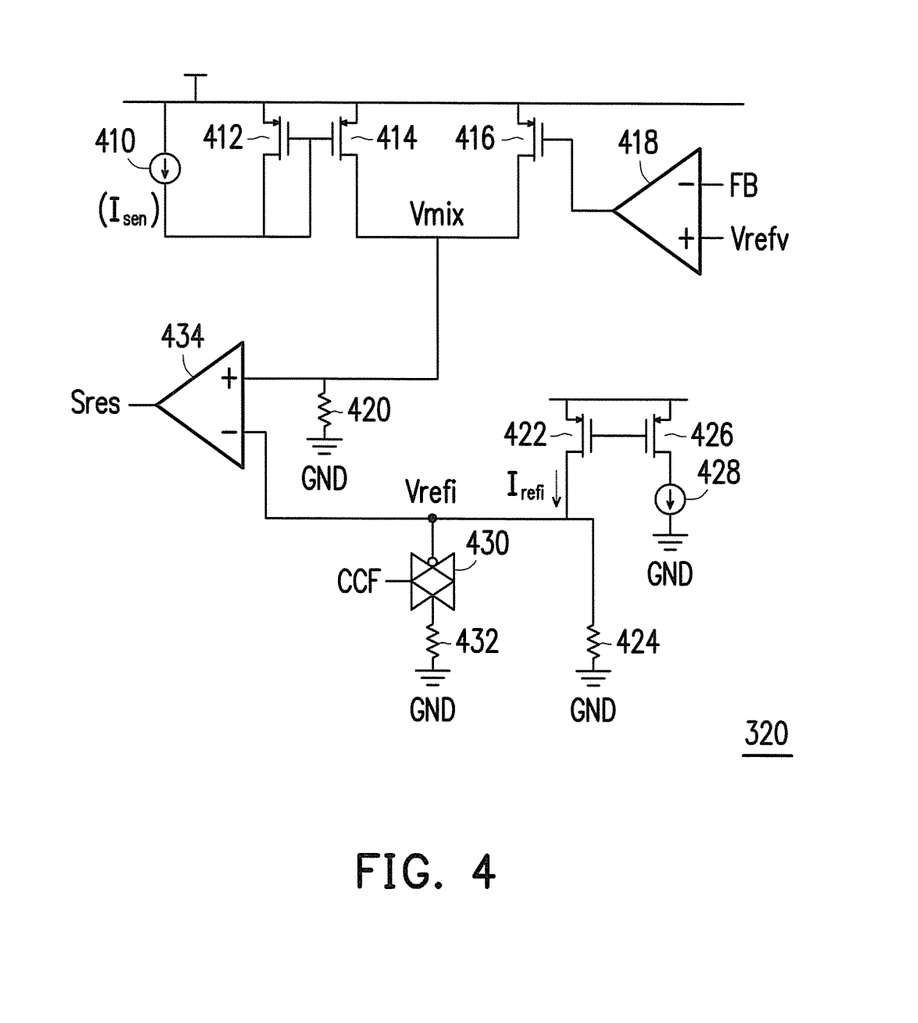
FIG. 4 is a circuit diagram of a smooth transition circuit according to an embodiment of the invention.

Referring to FIG. 3 and FIG. 4, the smooth transition circuit 320 includes a current source 410, a PMOS (P-type Metal Oxide Semiconductor) transistor 412, a PMOS transistor 414, a PMOS transistor 416, a comparator 418 and a resistor 420.

Their detailed coupling relationships are as follows. The current source 410 is related to the sense current signal Isen, and the two are in a linear ratio relation. A first terminal (e.g., source) of the PMOS transistor 412 is coupled to a first terminal of the current source 410, and a second terminal (e.g., drain) and a control terminal (e.g., gate) of the PMOS transistor 412 is coupled to a second terminal of the current source 410. A first terminal of the PMOS transistor 414 is coupled to the first terminal of the current source 410 and the first terminal of the PMOS transistor 412, and a control terminal of the PMOS transistor 414 is coupled to the control terminal of the PMOS transistor 412. A first input terminal (e.g., positive input terminal) of the comparator 418 receives a reference voltage Vrefv, and a second input terminal (e.g., negative input terminal) of the comparator 418 receives the feedback signal FB.

A first terminal of the PMOS transistor 416 is coupled to the first terminal of the PMOS transistor 414, a second terminal of the PMOS transistor 416 is coupled to a second terminal of the PMOS transistor 414, and a control terminal of the PMOS transistor 416 is coupled to an output terminal of the comparator 418. A first terminal of the resistor 420 is coupled to the second terminal of the PMOS transistor 414 and the second terminal of the PMOS transistor 416, and a second terminal of the resistor 420 is coupled to a ground terminal GND. A first voltage Vmix is generated at the first terminal of the resistor 420.

The smooth transition circuit 320 further includes a PMOS transistor 422, a resistor 424, a PMOS transistor 426, a current source 428, a switch 430 and a resistor 432.

Their detailed coupling relationships are as follows. A first terminal of the resistor 424 is coupled to a second terminal of the PMOS transistor 422, and a second terminal of the resistor 424 is coupled to the ground terminal GND. A first terminal of the PMOS transistor 426 is coupled to a first terminal of the PMOS transistor 422, and a control terminal of the PMOS transistor 426 is coupled to a control terminal of the PMOS transistor 422. A first terminal of the current source 428 is coupled to a second terminal of the PMOS transistor 426, and a second terminal of the current source 428 is coupled to the ground terminal GND. A control terminal of the switch 430 receives a mode signal CCF, and a first terminal of the switch 430 is coupled to the first terminal of the resistor 424. A first terminal of the resistor 432 is coupled to a second terminal of the switch 430, and a second terminal of the resistor 432 is coupled to the ground terminal GND. A second voltage Vrefi is generated at the first terminal of the resistor 424.

As shown in FIG. 3, a mode selection circuit 400 may generate the mode signal CCF according to the output voltage Vout. For instance, when the mode selection circuit 400 determines that the output voltage Vout is less than a predetermined voltage, the mode signal CCF indicates a first charging mode.

In the present embodiment, the smooth transition circuit 320 may generate the first voltage Vmix according to the sense current signal Isen and the feedback signal FB, generate the second voltage Vrefi according to the mode signal CCF, and compare the first voltage Vmix with the second voltage Vrefi by the comparator 434 to generate a reset signal Sres.

The current source 428 is used to make the PMOS transistor 422 generate a current Irefi. When the mode signal CCF indicates the first charging mode (e.g., the output voltage Vout is less than 2.65V, but the invention is not limited thereto), the switch 430 connects the resistor 424 and the resistor 432 in parallel, which has an equivalent resistance slightly less than a resistance of the resistor 424 or the resistor 432. Therefore, the second voltage Vrefi may be generated by using such equivalent resistance and the current Irefi, so as to control the reset signal Sres and achieve the purpose of trickle current.

In addition, a charging operation of the lithium battery may adopt a variety of charging modes.

When the mode signal CCF indicates a non-first charging mode, the switch 430 turns off the resistor 432 such that the equivalent resistance may be equal to the resistor 424. Accordingly, the equivalent resistance and the current Irefi may generate the second voltage Vrefi that is higher than that generated by in said parallel connection, and the charging mode may also provide the larger charging current at the same time. More specifically, the first charging mode may be trickle current mode, and the non-first charging mode may be constant current mode or constant voltage mode.

Figure 5:
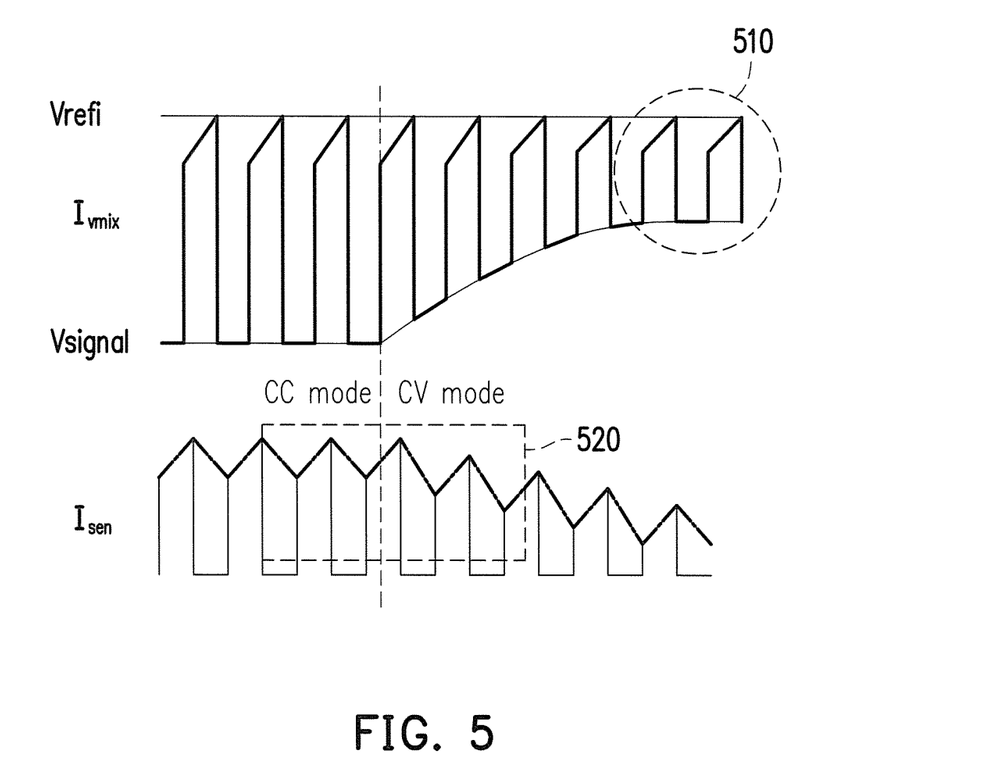
FIG. 5 is a waveform diagram of constant current mode to constant voltage mode according to an embodiment of the invention.

In the end of the charging process (i.e., at the second half stage of the charging operation), constant voltage mode is entered from constant current mode. Referring to FIG. 5 to FIG. 3 together, In constant current mode, since the output voltage Vout does not reach the preset value (e.g., the preset value may be 4.2V, but the invention is not limited thereto), the feedback signal FB will be a smaller voltage and a loop gain of voltage will not be large enough. A current signal Ivmix flowed from the first voltage Vmix only includes information from the sense current signal Isen. When the output voltage Vout approaches the preset value, the loop gain of voltage via the feedback circuit 360 will be large enough and the feedback signal FB fills a voltage signal Vsignal slowly into the first voltage Vmix to be mixed with the current signal Ivmix, such that a mixed signal shown by a dotted circle 510 may then be used to control changes in the output current $I_L$. In addition, the effect shown by a dotted circle 520 is a smooth transition of the output current $I_L$. Thus, the smooth transition circuit 320 may be used to achieve constant-voltage charging and mixing both voltage and current signals.

Figure 6:
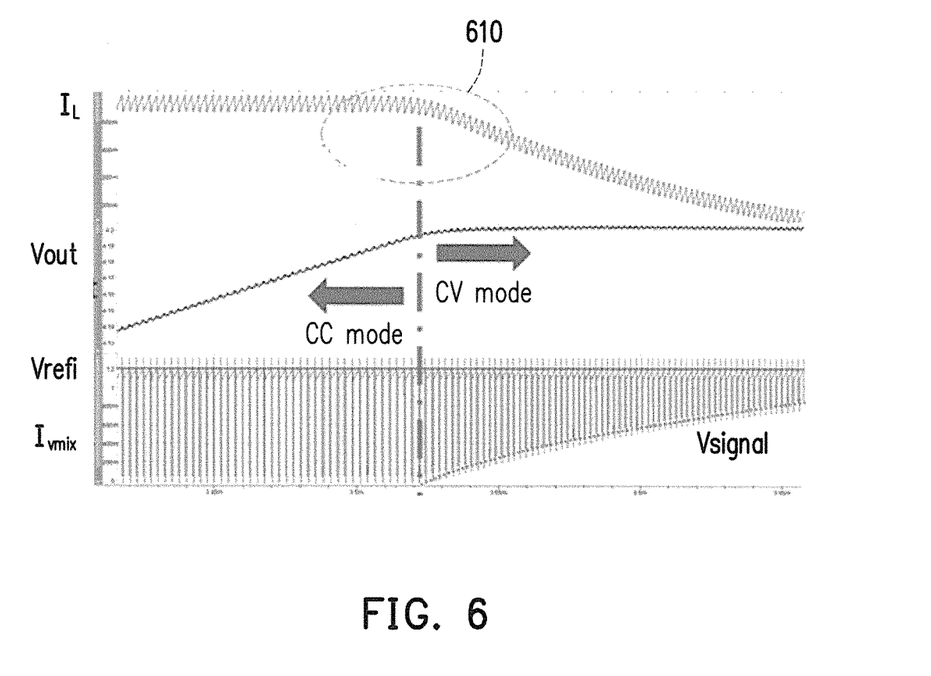
FIG. 6 is another waveform diagram of the constant current mode to the constant voltage mode according to an embodiment of the invention.

Referring to FIG. 3, FIG. 4 and FIG. 6 together, In FIG. 6, when the charging operation is in constant current mode, because the output voltage Vout from the output terminal is not large enough, the voltage signal Vsignal is zero due to insufficient loop gain and has no influence on controlling the charging system. The lithium battery charger 300 locks current only for the sense current signal Isen from the current sense circuit 350, and the current signal Ivmix flowed from the first voltage Vmix only includes information from the sense current signal Isen. The comparator 434 compares the current signal Ivmix with the second voltage Vrefi to lock on a peak current control, so as to achieve the purpose of locking the output terminal as a constant current.

In addition, when the output voltage Vout approaches a rated value, the voltage signal Vsignal starts to join the system and is equivalent to raising the sense current signal Isen so the current signal Ivmix may be synthesized upon signal analysis. The voltage at the output terminal may be locked by performing the peak current control on both the current signal Ivmix and the second voltage Vrefi. Accordingly, the lithium battery control circuit 310 has the advantage of preventing large surge current.

In addition, the effect shown by a dotted circle 610 is a smooth transition. The lithium battery control circuit 310 is controlled by simultaneously using both voltage and current signals, and is therefore similar to a buck converter in current mode in terms of system operation. Because the entire system may be simplified as a system with single pole upon stability analysis, the effect of simplifying the compensation circuit of the charger may be achieved.

In addition, the smooth transition circuit 320 may cooperate with the off-time control circuit 330 (to be described later) to also provide the effect of simplifying the compensation circuit of the charger in terms of system configuration.

Figure 7:
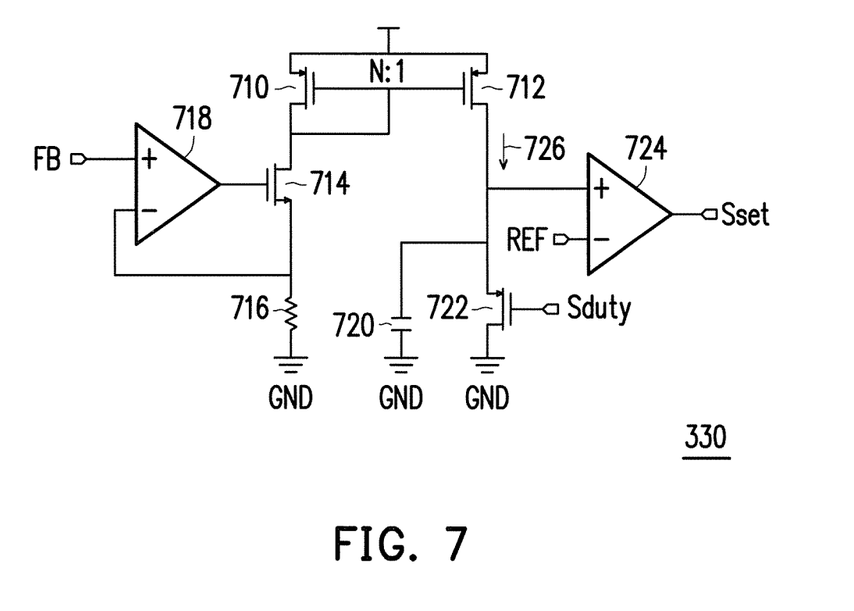
FIG. 7 is a circuit diagram of an off-time control circuit according to an embodiment of the invention.

Referring to FIG. 3 and FIG. 7, the off-time control circuit 330 includes a PMOS transistor 710, a PMOS transistor 712, a NMOS (N-type Metal Oxide Semiconductor) transistor 714, a resistor 716, a comparator 718, a capacitor 720, a NMOS transistor 722 and a comparator 724.

Their detailed coupling relationships are as follows. A first terminal of the PMOS transistor 712 is coupled to a first terminal of the PMOS transistor 710, and a control terminal of the PMOS transistor 712 is coupled to a second terminal and a control terminal of the PMOS transistor 710. A first terminal (e.g., drain) of the NMOS transistor 714 is coupled to the second terminal and the control terminal of the PMOS transistor 710. A first terminal of the resistor 716 is coupled to a second terminal (e.g., source) of the NMOS transistor 714, and a second terminal of the resistor 716 is coupled to the ground terminal GND. A first input terminal (e.g., positive input terminal) of the comparator 718 receives the feedback signal FB, a second input terminal (e.g., negative input terminal) of the comparator 718 is coupled to the first terminal of the resistor 716 and the second terminal of the NMOS transistor 714, an output terminal of the comparator 718 is coupled to a control terminal (e.g., gate) of the NMOS transistor 714.

A first terminal of the capacitor 720 is coupled to a second terminal of the PMOS transistor 712, and a second terminal of the capacitor 720 is coupled to the ground terminal GND. A first terminal of the NMOS transistor 722 is coupled to the first terminal of the capacitor 720, a second terminal of the NMOS transistor 722 is coupled to the ground terminal GND, and a control terminal of the NMOS transistor 722 receives the duty ratio signal Sduty. A first input terminal (e.g., the positive input terminal) of the comparator 724 is coupled to the second terminal of the PMOS transistor 712 and the first terminal of the capacitor 720, a second input terminal (e.g., negative input terminal) of the comparator 724 receives a reference voltage REF, and an output terminal of the comparator 724 outputs a set signal Sset.

It should be noted that, a ratio of current passing through the PMOS transistor 710 to current passing through the PMOS transistor 712 is N:1, wherein the current passing through the PMOS transistor 712 is defined as the first current 726 and N is a positive number.

In addition, configuration of the comparator 718, the PMOS transistor 710, the PMOS transistor 712 and the NMOS transistor 714 may be used as a voltage-to-current mechanism. The off-time control circuit 330 converts the feedback signal FB to generate the first current 726 by the voltage-to-current mechanism. The off-time control circuit 330 may further generate the set signal Sset by using the first current 726 and the duty ratio signal Sduty.

In addition, the logic control circuit 340 in FIG. 3 may be a SR flip-flop, but the invention is not limited thereto. For instance, a S terminal of the logic control circuit 340 is coupled to an output terminal of the off-time control circuit 330, and a R terminal of the logic control circuit 340 is coupled to an output terminal of the smooth transition circuit 320. A Q terminal of the logic control circuit 340 may generate the duty ratio signal Sduty for a pulse-frequency modulation according to the received reset signal Sres and the set signal Sset and output the duty ratio signal Sduty to the driving circuit 370. The driving circuit 370 may operate the output stage 380 according to the duty ratio signal Sduty. The lithium battery charger 300 completes a frequency conversion by using the duty ratio signal Sduty so as to prevent the system from subharmonic oscillation.

Further, the off-time control circuit 330 is a core of the entire charger. The off-time control circuit 330 is responsible for regulating a length of an off-time and suppressing an output ripple from becoming larger. The off-time control circuit 330 uses the feedback signal FB related to the output voltage Vout to control the length of the off-time. Accordingly, the lithium battery control circuit 310 may then control the switching frequency and the ripple size of the output current $I_L$.

In addition, the off-time control circuit 330 may use a single periodicity of "an off-time control" to eliminate subharmonic oscillation from affecting current in the buck converter in current mode.

Figure 8:
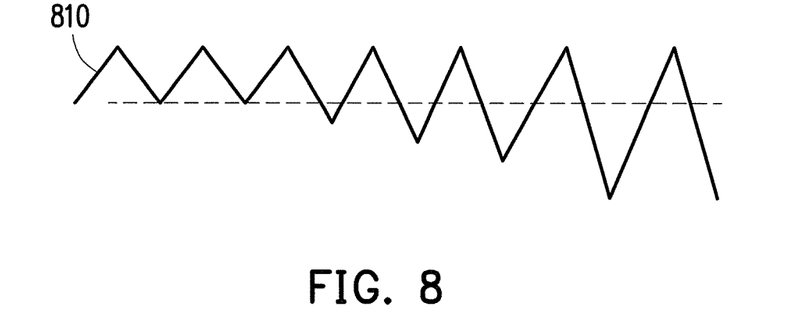
FIG. 8 is a waveform diagram of a conventional constant off-time.

On the other hand, because the output voltage Vout will constantly rise during the charging process, the issue of ever increasing output current ripple will definitely arise if the conventional constant off-time mechanism is still used. For instance, a waveform 810 shown in FIG. 8 is related to the output current $I_L$, and each sin wave in the waveform 810 represents the constant off-time. Among architectural characteristics of the buck converter, a discharge slope of "the off-time" is proportional to the output voltage, as shown by Equation 1 below.

$$\text{Off-time slope} = -\text{Vout}/L, \quad \text{(Equation 1)}$$

where Vout represents an output voltage value and L represents an inductance

When the off-time is one fixed constant and the corresponding slope is higher as the output voltage becomes higher based on the architectural characteristics of the buck converter, the output current ripple will be increasingly higher as the result. Thus, the length of the off-time must be linearly controlled and regulated by the feedback signal while suppressing the output current as described in the invention so the charging efficiency may be improved.

As shown in FIG. 7, the feedback signal FB and one voltage (V)-to-current (I) circuit are used to generate a current related to voltage in the present embodiment. The current 726 obtained by scaling the current related to voltage using a proper linear ratio (N:1) is used for charging the capacitor 720, and a length of the charge time is defined as the off-time.

The off-time control circuit 330 may cooperate with the smooth transition circuit 320 previously described. In the present embodiment, the NMOS transistor 722 uses the duty ratio signal Sduty to control a path for discharging. The comparator 724 uses the reference voltage REF as an upper bound of charge voltage. In this invention, the length of the off-time may be defined through charging and discharging of the capacitor 720 to thereby control the switching frequency of the system.

Because the voltage-to-current mechanism belongs to a linear transition/scaling, one off-time linearly related to the output voltage may be obtained using the characteristic of capacitance-current, as shown by Equation 2 and Equation 3 below.

$$Ic = C\frac{dVc}{dt} \text{ and } Ic = \frac{FB}{Rf}, \quad \text{(Equation 2)}$$

where C represents a capacitance of the capacitor 720, Ic represents a current value flowed through the capacitor 720, Vc represents a voltage value across two terminals of the capacitor 720, FB represents a value of the feedback signal and Rf represents a resistance of the resistor 716.

$$\text{Off-time: } T = \frac{Rf \times C}{FB} \times Vc \quad \text{(Equation 3)}$$

$$\text{Off-time slope} = -\frac{Vout}{L} \text{ and ripple} = -\frac{Vout}{L} \times T, \quad \text{(Equation 4)}$$

where Vout represents a value of the output voltage and L represents an inductance.

$$FB = k \times Vout \text{ and } Vc = REF, \quad \text{(Equation 5)}$$

where k is a coefficient or a constant parameter and REF represents a value of the reference voltage.

$$\text{Off-time: } T = \frac{Rf \times C}{k \times Vout} \times REF. \quad \text{(Equation 6)}$$

$$\text{Ripple} = -\frac{Vout}{L} \times \frac{Rf \times C}{k \times Vout} \times REF. \quad \text{(Equation 7)}$$

$$\text{Ripple} = -\frac{Rf \times C}{L} \times k' \times REF, \quad \text{(Equation 8)}$$

where $$k' = \frac{1}{k},$$

is a coefficient or a constant parameter.

The feedback signal FB is related to a magnitude of the output voltage Vout. As the output voltage Vout is higher, the current 726 scaled through the proper ratio is accordingly larger, such that the charge time is shorten as equivalent to reduction on the off-time of the circuit.

In view of derivation of Equation 4 through Equation 8, by introducing the feedback signal FB related to the output voltage, the parameter in the formula of the output ripple proportional to the output voltage Vout may be cancelled. Thus, when the formula includes only the constant parameter without the function of the output voltage, the output current ripple will not become larger when the output voltage is increasing, so the output current ripple may be solved or reduced.

In consideration of system performance, the invention is applicable on chip to replace the common method of sensing resistance and average current by a current sense method and the peak current control. Accordingly, not only may the shortcoming of the conventional technology in terms of efficiency be solved, overall efficiency for the charger may also be improved.

In addition, the peak current control may be utilized for solving ripple encountered by a switching charging circuit, and may also be used in the off-time control circuit for the ripple control so as to solve the ripple issue.

In consideration of both system stability and safety, the oscillation in transition between the charging modes and non-ideal surge current during operation of the charger may all be successfully prevented by using the smooth transition circuit in combination with the smooth transition and the peak current control. The charging operation of the charger in this invention also includes a current mode to simplify the complex compensation circuit in the common switching charger.

Based on the content disclosed in the foregoing embodiments, the lithium battery charger of the invention includes a circuit scheme with smooth transition. The lithium battery charger of the invention is designed to improve for high performance, high stability, low cost and low complexity, and is operated by using the peak current control and using both the off-time control and the current mode.

Other than solving the issue of ripple and surge current, the invention may also effectively protect the battery and extend a lifetime of the battery.

The system of the invention integrates three characteristics in the smooth transition circuit including simplified compensation, protected circuit and system structure. The invention may indirectly lower complexity of the switching charger while reducing manufacturing costs thereof and is in line with current trends in developing 3C products.

In summary, the lithium battery control circuit and the lithium battery charger of the invention may prevent the surge current and the oscillation phenomenon by the smooth transition circuit. Furthermore, the lithium battery control circuit and the lithium battery charger may control the switching frequency and the ripple size of the output current by the off-time control circuit.

What is claimed is:

1. A lithium battery control circuit, adapted to control a lithium battery charger and receive a sense current signal from a current sense circuit, a feedback signal from a feedback circuit and a duty ratio signal from a logic control circuit, and comprising:
    a smooth transition circuit, generating a first voltage according to the sense current signal and the feedback signal, generating a second voltage according to a mode signal, and comparing the first voltage with the second voltage to generate a reset signal, wherein the sense current signal is related to an output current, the feedback signal is related to an output voltage, the mode signal is configured to indicate whether or not in a first charging mode, and the second voltage in the first charging mode is less than the second voltage in a non-first charging mode; and
    an off-time control circuit, converting the feedback signal to generate a first current by a voltage-to-current mechanism, and generating a set signal by using the first current and the duty ratio signal, and controlling a driving circuit and an output stage according to the duty ratio signal to prevent the battery control circuit from subharmonic oscillation.

2. The lithium battery control circuit according to claim 1, wherein the smooth transition circuit comprises:
    a first current source, related to the sense current signal;
    a first PMOS transistor, a first terminal of the first PMOS transistor being coupled to a first terminal of the first current source, a second terminal and a control terminal of the first PMOS transistor being coupled to a second terminal of the first current source;
    a second PMOS transistor, a first terminal of the second PMOS transistor being coupled to the first terminal of the first current source and the first terminal of the first PMOS transistor, a control terminal of the second PMOS transistor being coupled to the control terminal of the first PMOS transistor;
    a first comparator, a first input terminal of the first comparator receiving a first reference voltage, a second input terminal of the first comparator receiving the feedback signal;
    a third PMOS transistor, a first terminal of the third PMOS transistor being coupled to the first terminal of the second PMOS transistor, a second terminal of the third PMOS transistor being coupled to a second terminal of the second PMOS transistor, a control terminal of the third PMOS transistor being coupled to an output terminal of the first comparator; and
    a first resistor, a first terminal of the first resistor being coupled to the second terminal of the second PMOS transistor and the second terminal of the third PMOS transistor, a second terminal of the first resistor being coupled to a ground terminal, wherein the first voltage is generated at the first terminal of the first resistor.

3. The lithium battery control circuit according to claim 1, wherein the smooth transition circuit comprises:
    a fourth PMOS transistor;
    a second resistor, a first terminal of the second resistor being coupled to a second terminal of the fourth PMOS transistor, a second terminal of the second resistor being coupled to a ground terminal;
    a fifth PMOS transistors, a first terminal of the fifth PMOS transistor being coupled to a first terminal of the fourth PMOS transistor, a control terminal of the fifth PMOS transistor being coupled to a control terminal of the fourth PMOS transistor;
    a second current source, a first terminal of the second current source being coupled to a second terminal of the fifth PMOS transistor, a second terminal of the second current source being coupled to the ground terminal;
    a switch, a control terminal of the switch receiving the mode signal, a first terminal of the switch being coupled to the first terminal of the second resistor; and
    a third resistor, a first terminal of the third resistor being coupled to a second terminal of the switch, a second terminal of the third resistor being coupled to the ground terminal,
    wherein the second voltage is generated at the first terminal of the second resistor.

4. The lithium battery control circuit according to claim 3, wherein the switch connects the second resistor and the third resistor in parallel when the mode signal indicates the first charging mode, and the switch is turned off to disconnect the third resistor when the mode signal indicates the non-first charging mode.

5. The lithium battery control circuit according to claim 1, wherein the smooth transition circuit comprises:
    a second comparator, a first input terminal of the second comparator receiving the first voltage, a second input terminal of the second comparator receiving the second voltage, an output terminal of the second comparator outputting the reset signal.

6. The lithium battery control circuit according to claim 1, wherein the off-time control circuit comprises:
- a sixth PMOS transistor;
- a seventh PMOS transistor, a first terminal of the seventh PMOS transistor being coupled to a first terminal of the sixth PMOS transistor, a control terminal of the seventh PMOS transistor being coupled to a second terminal and a control terminal of the sixth PMOS transistor;
- a first NMOS transistor, a first terminal of the first NMOS transistor being coupled to the second terminal and the control terminal of the sixth PMOS transistor;
- a fourth resistor, a first terminal of the fourth resistor being coupled to a second terminal of the first NMOS transistor, a second terminal of the fourth resistor being coupled to a ground terminal;
- a third comparator, a first input terminal of the third comparator receiving the feedback signal, a second input terminal of the third comparator being coupled to the first terminal of the fourth resistor and the second terminal of the first NMOS transistor, an output terminal of the third comparator being coupled to a control terminal of the first NMOS transistor;
- a first capacitor, a first terminal of the first capacitor being coupled to a second terminal of the seventh PMOS transistor, a second terminal of the first capacitor being coupled to the ground terminal;
- a second NMOS transistor, a first terminal of the second NMOS transistor being coupled to the first terminal of the first capacitor, a second terminal of the second NMOS transistor being coupled to the ground terminal, a control terminal of the second NMOS transistor receiving the duty ratio signal; and
- a fourth comparator, a first input terminal of the fourth comparator being coupled to the second terminal of the seventh PMOS transistor and the first terminal of the first capacitor, a second input terminal of the fourth comparator receiving a second reference voltage, an output terminal of the fourth comparator outputting the set signal.

7. The lithium battery control circuit according to claim 6, wherein a ratio of current passing through the sixth PMOS transistor to current passing through the seventh PMOS transistor is N:1, wherein the current passing through the seventh PMOS transistor is defined as the first current and N is a positive number.

8. The lithium battery control circuit according to claim 7, wherein the off-time control circuit uses the first current to charge the first capacitor according to the duty ratio signal so as to obtain an off-time linearly related to the output voltage.

9. The lithium battery control circuit according to claim 1, wherein the logic control circuit is coupled to the smooth transition circuit and the off-time control circuit, and generating the duty ratio signal for a pulse-frequency modulation according to the reset signal and the set signal.

10. The lithium battery control circuit according to claim 1, wherein the first charging mode is a trickle current mode.

11. A lithium battery charger, comprising:
a lithium battery control circuit, comprising:
- a smooth transition circuit, generating a first voltage according to a sense current signal and a feedback signal, generating a second voltage according to a mode signal, and comparing the first voltage with the second voltage to generate a reset signal, wherein the feedback signal is related to an output voltage, the mode signal is configured to indicate whether or not in a first charging mode, and the second voltage in the first charging mode is less than the second voltage in a non-first charging mode;
- an off-time control circuit, converting the feedback signal to generate a first current by a voltage-to-current mechanism, and generating a set signal by using the first current and a duty ratio signal;
- a current sense circuit, configured to generate the sense current signal according to an output current; and
- a feedback circuit, configured to generate the feedback signal according the output voltage.

12. The lithium battery charger according to claim 11, further comprising: a driving circuit, wherein the lithium battery control circuit further comprises a logic control circuit, and the logic control circuit generates the duty ratio signal for the driving circuit according to the reset signal and the set signal and feeding back to the off-time control circuit.

* * * * *